United States Patent
Lavi

[19]

[11] Patent Number: 6,119,670
[45] Date of Patent: Sep. 19, 2000

[54] FUEL CONTROL SYSTEM AND METHOD FOR AN INTERNAL COMBUSTION ENGINE

[75] Inventor: Eitan Lavi, El Paso, Tex.

[73] Assignee: Autotronic Controls Corporation, El Paso, Tex.

[21] Appl. No.: 08/920,581

[22] Filed: Aug. 29, 1997

[51] Int. Cl.$^7$ .................................................. F02D 41/14
[52] U.S. Cl. ............................................................ 123/674
[58] Field of Search .................................. 123/674, 475, 123/473, 494

[56] References Cited

U.S. PATENT DOCUMENTS

| | | | |
|---|---|---|---|
| 4,517,952 | 5/1985 | Hosoya ................................. | 123/475 |
| 4,543,936 | 10/1985 | Gardner et al. ...................... | 123/475 |
| 4,640,253 | 2/1987 | Kamai ................................... | 123/475 |
| 4,653,450 | 3/1987 | Arnold et al. ....................... | 123/475 |
| 5,092,301 | 3/1992 | Ostdiek ................................. | 123/494 |
| 5,297,046 | 3/1994 | Nakaniwa ............................. | 123/674 |
| 5,320,080 | 6/1994 | Kadowaki ............................ | 123/674 |
| 5,325,835 | 7/1994 | Kimata et al. ....................... | 123/475 |
| 5,464,000 | 11/1995 | Pursifull et al. .................... | 123/674 |
| 5,566,662 | 10/1996 | Messih ................................. | 123/674 |
| 5,577,486 | 11/1996 | Harima et al. ...................... | 123/674 |

*Primary Examiner*—Erick Solis
*Attorney, Agent, or Firm*—Fitch, Even, Tabin & Flannery

[57] ABSTRACT

A fuel injection system for small engines. A controller is provided to monitor manifold absolute pressure, engine RPM and engine oxygen levels. Fuel injector pulses are synchronized to minima in the manifold absolute pressure signal. The width of the pulses is varied depending upon the manifold absolute pressure, the engine RPM, and the oxygen level. In addition, a plurality of correction factors are available to adjust the pulse width depending on engine performance.

31 Claims, 8 Drawing Sheets

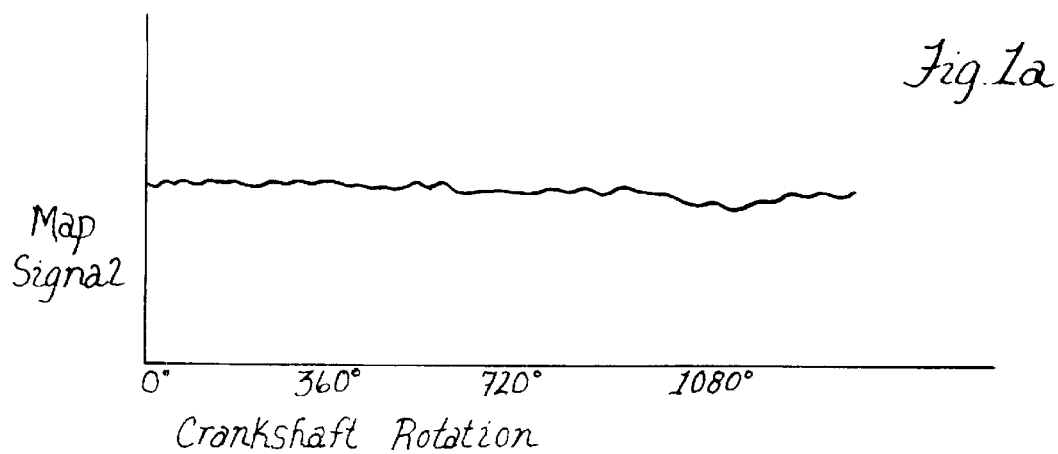
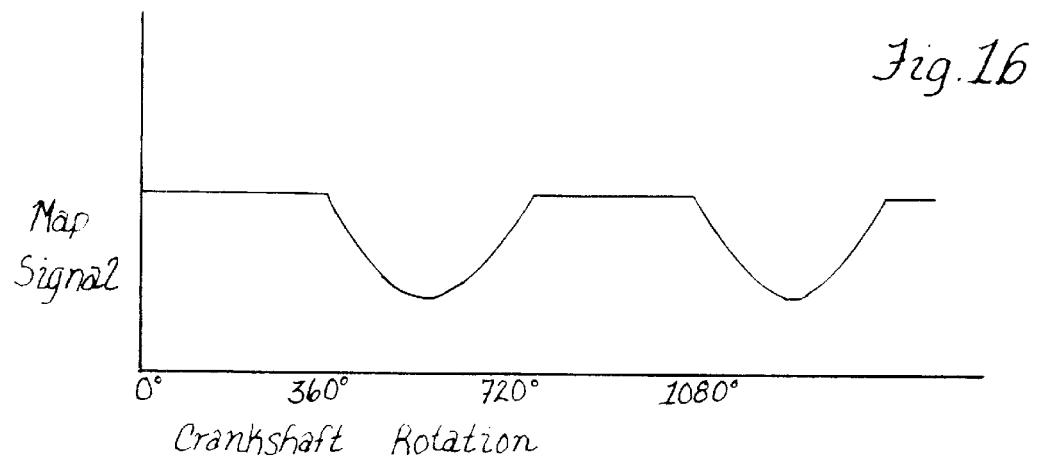
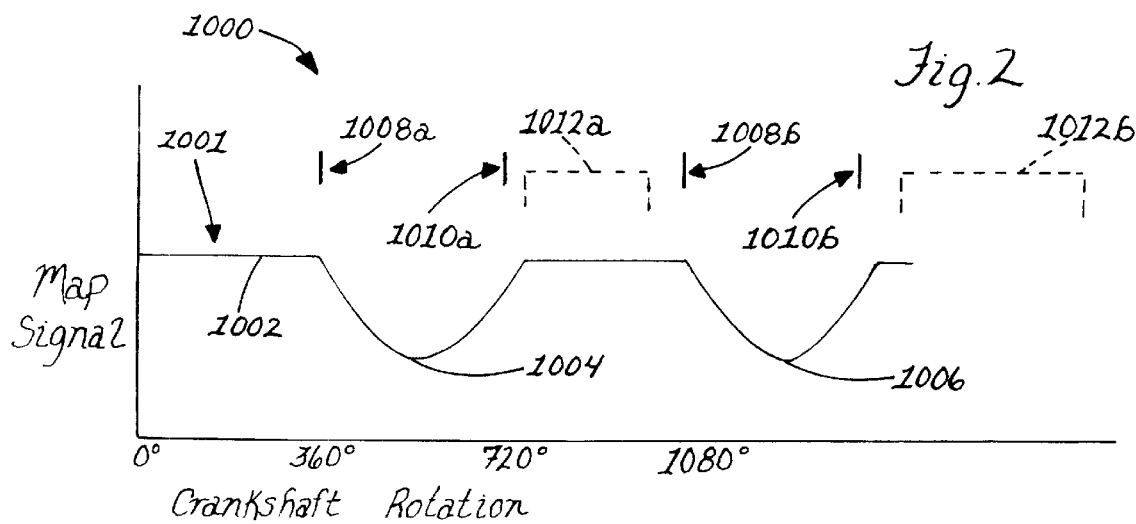

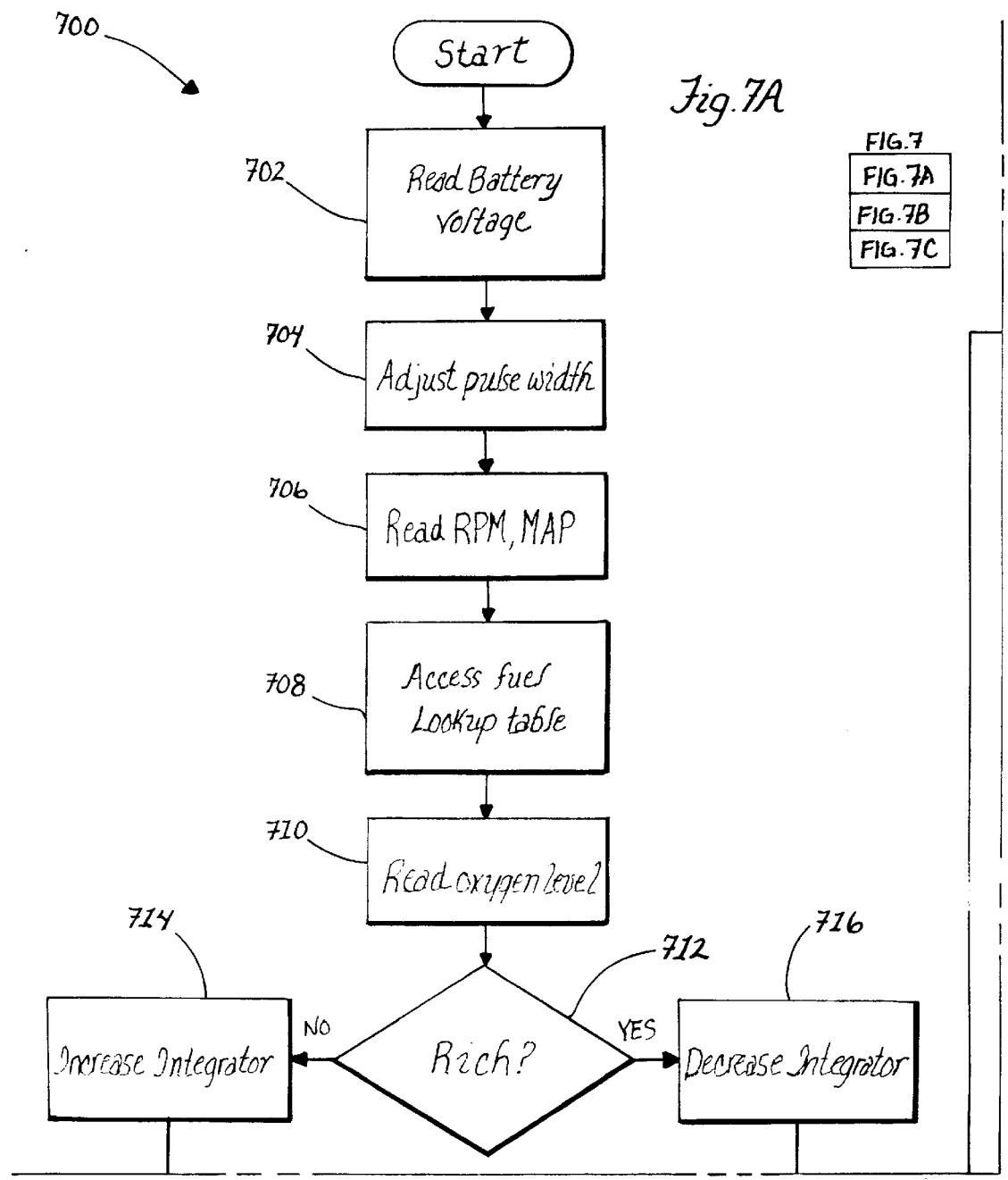

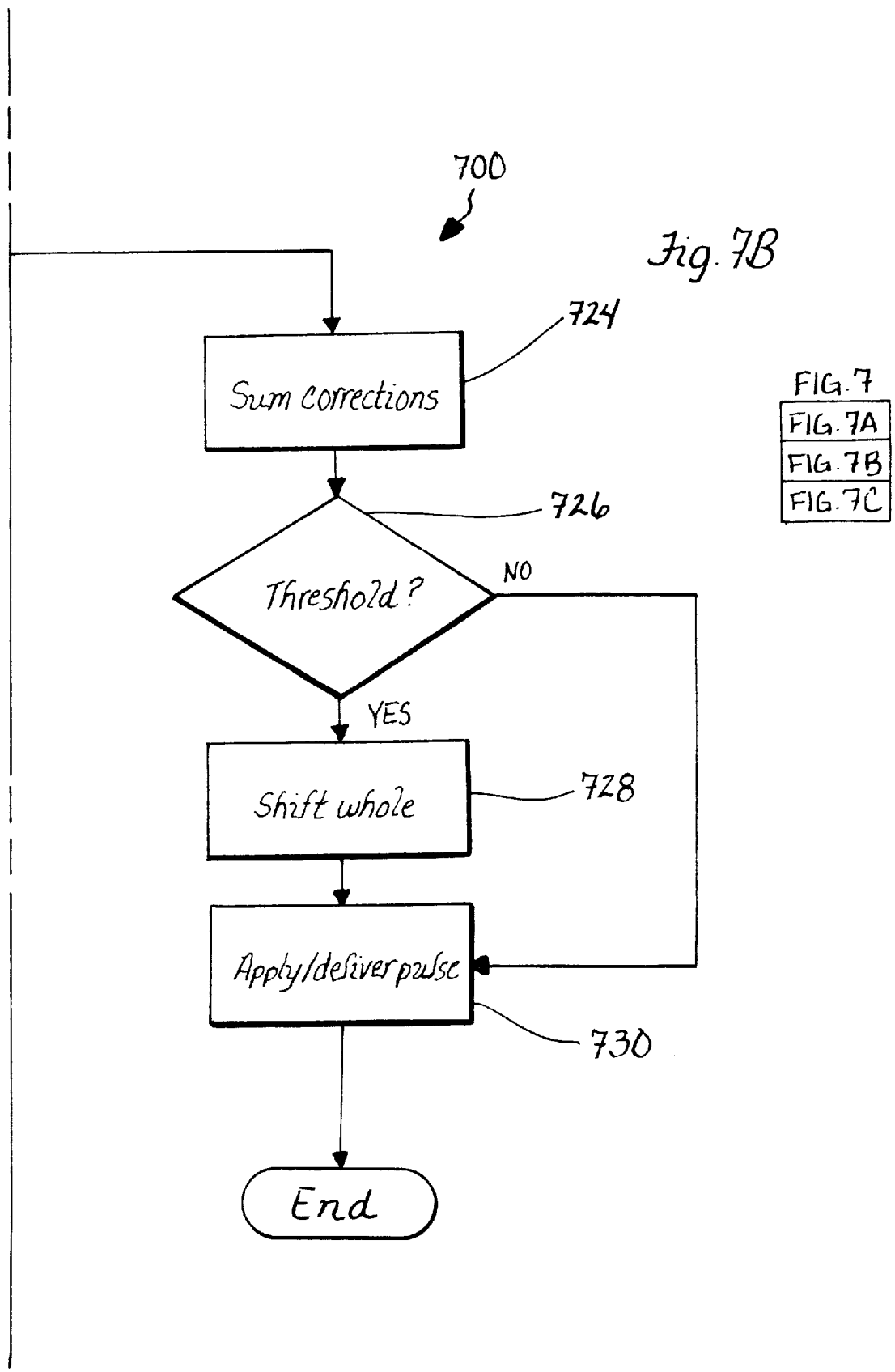

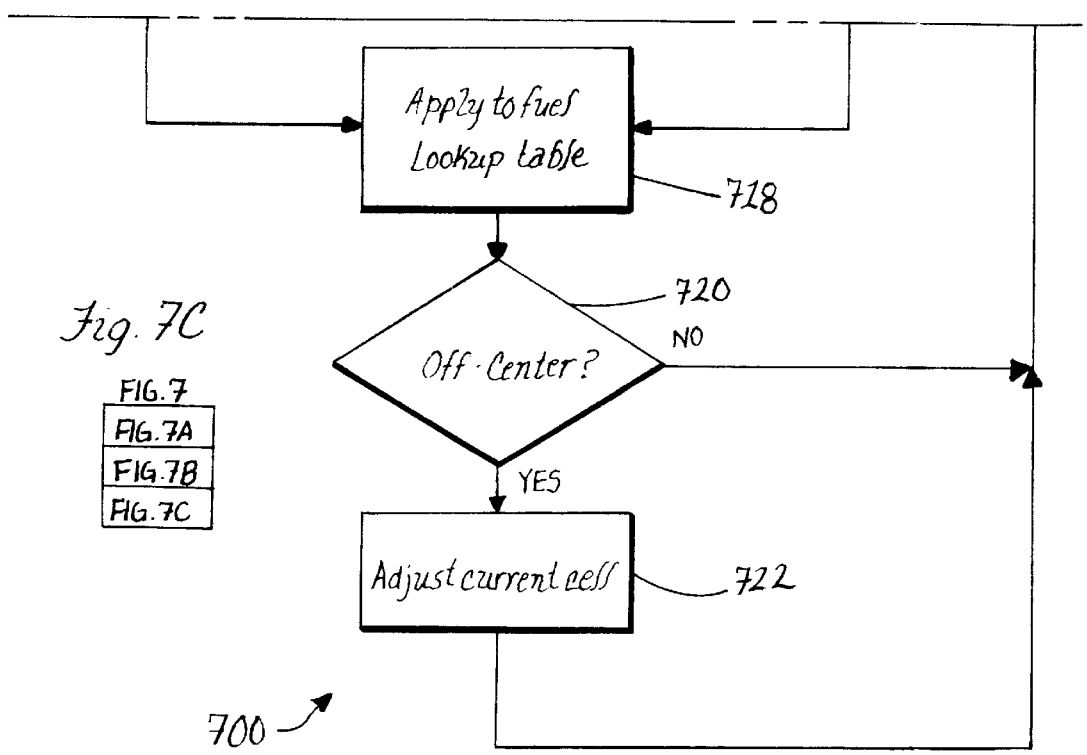

FUEL CONTROL SYSTEM AND METHOD FOR AN INTERNAL COMBUSTION ENGINE

RESERVATION OF COPYRIGHT

A portion of the disclosure of this patent document contains material which is subject to copyright protection. The copyright owner has no objection to facsimile reproduction by anyone of the patent document or the patent disclosure as it appears in the Patent and Trademark Office patent file or records, as it becomes available to the public, but otherwise reserves all copyright rights whatsoever.

BACKGROUND OF THE INVENTION

1. Field of the Invention

The present invention relates to engines and, particularly, to a small engine fuel injection system.

2. Description of Related Art

Small single and twin cylinder engines fueled by propane are in common use in such applications as floor buffing, commercial carpet cleaning and the like. Propane is used in these applications since it is inherently cleaner burning than gasoline, especially in an area of carbon monoxide exhaust emissions.

In such small engines, the propane fuel is typically metered to the engine either by a Venturi mixer or a variation of that principle, a spudded carburetor. Such systems are highly affected by small variations such as air cleaner restriction, regulator pressure drift, or fuel hose restriction. In addition these systems do not provide a consistent and predictable air/fuel mixture throughout the entire range of operating conditions. In addition, such systems do not allow for any monitoring of fuel system operation. Deteriorated engine tune, fuel composition deviation, altitude, or other conditions which could lead to undesirably high levels of CO (carbon monoxide) emission.

Closed loop fuel controls for large engines, in which feedback is provided concerning the actual air/fuel calibration, particularly for engines in motor vehicles, are known. In such modern fuel-injected engines, the primary input used to determine the amount of fuel required by the engine (i.e., determination of the pulse width for the fuel injectors) is a "speed density" reading. This is calculated using engine RPM (revolutions per minute) and the manifold absolute pressure (MAP) sensor voltage. The manifold absolute sensor voltage is a signal indicative of engine manifold pressure during intake and compression. In more advanced engines, additional sensor inputs such as intake air temperature, engine coolant temperature, and the like are used, but RPM and MAP are the principal inputs. In a multi-cylinder engine, the MAP voltage signal is fairly constant and thus is readily detectable, since the individual cylinder firings average out. For example, in an 8 cylinder engine, as illustrated in FIG. 1a, the MAP voltage signal is virtually a straight line, assuming constant throttle and engine load settings.

However, as can be seen in FIG. 1b, in single cylinder engines there is considerable pulsation and variation in the MAP voltage signal. Such extreme variation makes calculation of the proper fuel injector pulse width very difficult. One approach which has been attempted is to take the minimum and the maximum MAP voltages and average them to obtain a value to calculate fuel flow. However, this approach is suboptimal in achieving the proper fuel ratios.

Accordingly, there is a need for a closed loop fuel control system for small single and twin cylinder engines. There is similarly a need for a closed loop fuel injection system for a single cylinder engine which employs the MAP signal to achieve proper fuel ratio control.

BRIEF DESCRIPTION OF THE DRAWINGS

A better understanding of the present invention is obtained when the following detailed description is considered in conjunction with the following drawings in which:

FIGS. 1a and 1b are diagrams of MAP signal voltage versus crankshaft rotation from the preceding intake cycle;

FIG. 2 is a diagram of the use of MAP signal voltage to determine correct fuel injector pulsing according to an embodiment of the present invention;

FIG. 7 is a flow chart illustrating a method for fuel injection according to the embodiment of FIG. 3.

SUMMARY OF THE INVENTION

Figure 3:
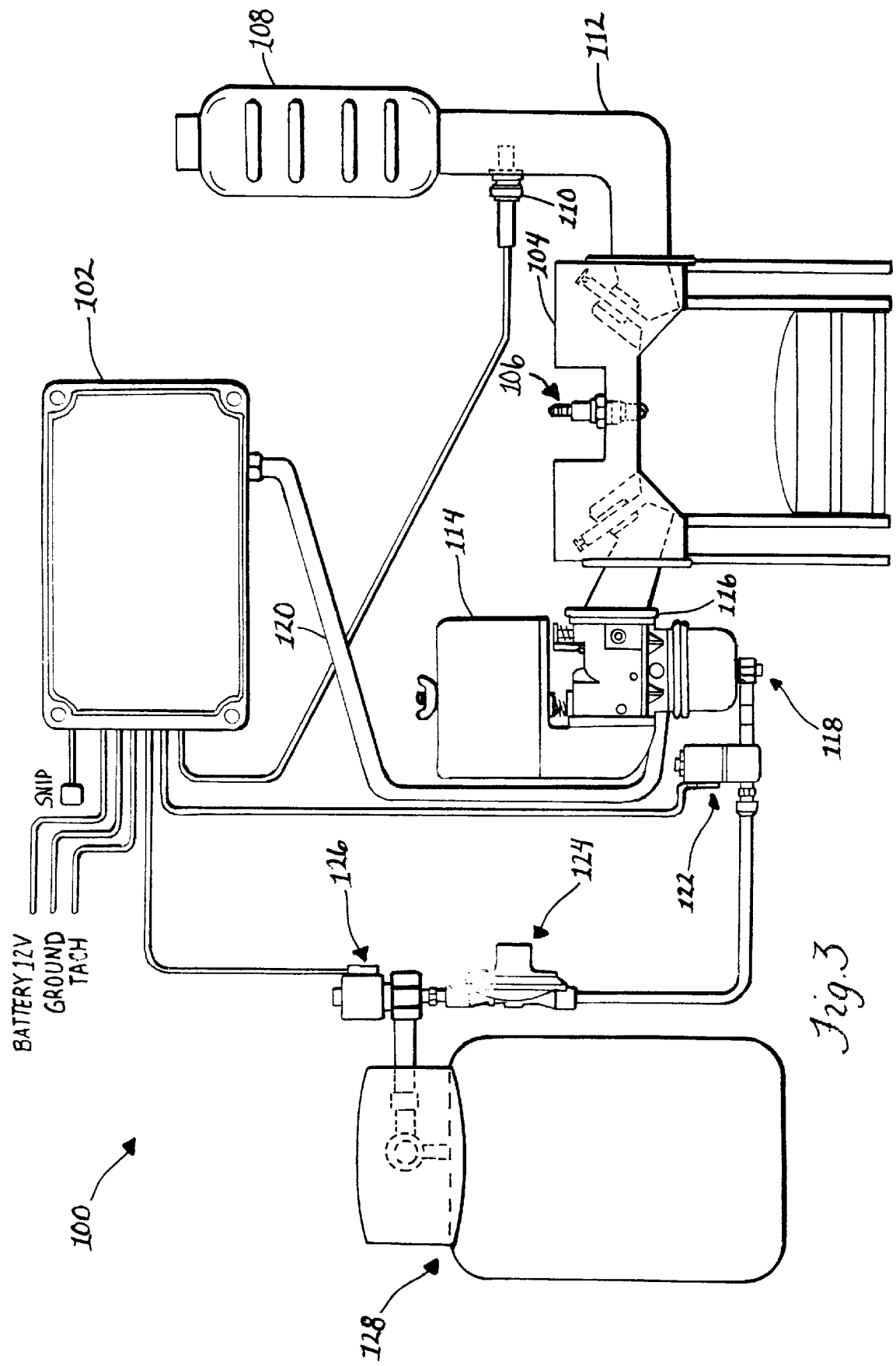
FIG. 3 is a block diagram illustrating a fuel injection system according to an embodiment of the present invention.

These and other problems in the prior art are overcome in large part by a small engine fuel injection system according to the present invention. A method according to one embodiment of the present invention employs the minimum MAP voltage signal to calculate the pulse width for a fuel injector. More particularly, a fuel injection system according to an embodiment of the present invention uses the RPM and MAP sensor inputs to calculate the amount of fuel required for the next spark firing. A pulse width modulated solenoid is provided which receives fuel vapor and injects fuel into the throttle body.

During the intake stroke, cylinder suction causes the pressure in the intake manifold to drop and reach a minimum. This minimum approximates the cylinder pressure when the valve is closed and thus is directly related to the amount of air in the cylinder. A controller for the fuel injector system samples the MAP sensor voltage between the firings. This minimum MAP value is compared to the minimum from the previous firing to identify compression spark firing or waste spark firing. By comparing the two minima, the controller identifies the correct pressure value and synchronizes the fuel delivery to the correct spark.

A look-up table having RPM and MAP voltages as inputs is provided to determine the correct fuel injector pulse widths. A correction table stores values to compensate for performance variations. Finally, a gain correction is provided to compensate for engine variations.

DETAILED DESCRIPTION OF THE INVENTION

Turning now to the drawings and with particular attention to FIG. 2, a schematic showing use of the MAP signal and spark firing relative to fuel injector pulsing is shown. The schematic 1000 includes the MAP signal voltage 1001 versus crankshaft rotation. The MAP signal voltage 1001 has minima 1004, 1006. The MAP signal voltage also has a relatively steady state value 1002. The MAP signal voltage

1001 has minima at 1004, 1006 due to the intake stroke. More particularly, during the intake stroke, the cylinder suction causes the pressure in the intake manifold to drop and reach the minimum value. The minima 1004, 1006 approximate the cylinder pressure when the valve is closed and thus directly relate to the amount of air and fuel in the cylinder. Compression or ignition spark firings 1010*a*, 1010*b* normally occur after the dip in the manifold pressure (i.e., after the minima 1004, 1006). By contrast, the waste spark firings 1008*a*, 1008*b* occur at the steady state manifold pressure 1002. By detecting the minima 1004, 1006, the fuel injector system identifies the correct pressure value synchronizing the fuel delivery to the correct spark. Thus, after the ignition sparks 1010*a*, 1010*b*, fuel injector pulses 1012*a* and 1012*b* are provided, respectively.

As will be described in greater detail below, a fuel injection controller 102 (FIG. 3) in a system according to one embodiment of the present invention samples the MAP sensor voltage from two milliseconds after every firing until the next firing at a 2 KHZ rate. The fuel injection controller 102 adds four samples in sequence and compares them to the next four saving the minimum. The minimum MAP sensor voltage value is then compared to the minimum from the previous firing to identify the compression spark firing or waste spark firing. By comparing the two minima, the fuel injection controller 102 synchronizes the fuel pulses and uses the correct pressure value to compute the necessary amount of fuel in a look-ahead fashion (i.e., the fuel need from a look-up table is determined the previous cycle; correction is provided for load changes, based on the MAP voltage, as will be discussed in greater detail below).

When a compression minimum is detected, the fuel injection controller 102 accesses a fuel look-up table (not shown) to determine the width of the subsequent fuel pulse. As part of this process, as will be described in greater detail below, the fuel injection controller 102 uses the RPM and minimum MAP value to calculate the amount of fuel which is to be provided. An analog circuit converts the received magneto primary coil voltage, which is representative of the engine RPM, to a 5 V square wave. The resulting clean and conditioned square wave is then sent to the fuel injection controller for timing measurements.

The correct pulse width can be determined through interpretation of the actual MAP pressure and the RPM. More particularly, the fuel look-up table of pulse width values is stored in processor-accessible memory. Nine values of MAP and four RPM values, defining 36 cells, are used. Each cell corresponds to a fuel injector pulse width. If the MAP and RPM measured values do not correspond to their tabular coordinates, interpolation may be used. It is noted that greater or fewer than nine MAP values and four RPM values may be employed.

In addition, the fuel injection controller 102 uses an oxygen sensor 110 input to determine whether the air/fuel ratio in the exhaust is richer or leaner than stoichiometry and provides a correction, stored in an integrator register (not shown), to the values in the fuel look-up table. The value in the integrator register is centered at 128, which corresponds to no correction. In one embodiment, the total control range is plus or minus 25%. The oxygen sensor 110 voltage is sampled after every firing. If the oxygen sensor 110 voltage corresponds to lean, the fuel injection controller 102 increments the value in the integrator register and if the oxygen sensor voltage corresponds to rich, decrements the value in the integrator register. The integrator value is multiplied with the output from the fuel look-up table, thereby increasing or decreasing fuel injector pulse width. The entire table (i.e., each cell) is updated by this integrator value. This type of continuous update causes the air/fuel ratio to hover around very close to the desired stoichiometric air/fuel ratio.

In addition to the integrator register, a correction table is used to correct individual values in the look-up table. The correction table is similar to having a separate integrator value for each cell of the fuel look-up table. If the operating point of the integrator register is away from center by a predetermined amount, the cell in the fuel look-up table closest to the working conditions will be corrected to the "actual" value (i.e., shifted by the integrator amount) and stored in the correction table, thus reshaping the fuel pulse width to the particular engine and hardware. The values in the correction table are stored in EEPROM for more correct tables in future operations.

In addition to the integrator register and correction table, a fuel map gain correction is provided. The fuel map gain correction is another correction factor, but one which modifies the entire fuel look-up table. The fuel map gain correction is used to compensate for fuel look-up table "drift," which can result if the entire table has drifted from its predetermined settings. More particularly, if the total sum of shifts in the correction table is larger than a predetermined amount, the entire fuel look-up table will be updated by the gain correction factor. In one embodiment, the threshold sum of shifts is 10.

Turning now to FIG. 3, a block diagram illustrating a fuel injection system 100 including a fuel injection controller 102 according to the present invention is shown. The fuel injection system 100 includes a controller 102 which is configured to receive inputs from a 12-volt battery (not shown), a primary signal from the magneto (not shown) as well as having a ground input. In addition, the fuel injection controller 102 is configured is receive an input from an oxygen sensor 110 positioned within an exhaust manifold 112 of the engine. A vacuum hose 120 connects the fuel injection controller 102 to the carburetor 116. The vacuum hose 120 provides the MAP input to the fuel injection controller. A muffler is coupled to the exhaust manifold. A propane tank 128 provides fuel for the carburetor 116.

More particularly, the fuel injection controller 102 controls an electric shut-off valve 126 or fuel lock-off solenoid. When zero RPM are detected, the fuel injection controller 102 causes the fuel to turn off by controlling the ground to the solenoid. A fuel pressure regulator 124 is also provided to regulate (i.e., maintain consistent pressure) the flow of fuel to a fuel injector 122. The fuel injector 122 includes a pulse width modulated solenoid with a peak-and-hold driver (not shown). The fuel injector 122 is coupled to a fuel inlet pipe 118 to direct the fuel to a carburetor 116. An air cleaner 114 is further coupled to the carburetor 116. The engine 104 is provided with one or more spark plugs 106. As will be discussed in greater detail below, the fuel injection controller 102 is configured to determine pressure within the engine manifold 104 and cause the fuel injector 122 to inject fuel from the propane tank 128 at appropriate intervals and pulse width. As will be discussed in greater detail below, the fuel injection controller 102 is configured to deliver one fuel pulse for every two revolutions of the engine.

The fuel injection controller 102 is further provided with a "SNIP loop", which is essentially a switch activatable by a user, for example. Activation of the SNIP loop allows a user to deactivate an engine shut-off feature. More particularly, the fuel injection controller 102 is configured to shut off the engine if the reading from the oxygen sensor indicates that the engine has been running rich for a programmable predetermined period. In addition, the fuel injection controller 102 is configured to shut off the engine if the vacuum hose is not connected and the MAP reading is relatively steady. Activation of the SNIP loop (e.g., by cutting a wire) causes this feature to be deactivated.

Figure 4:
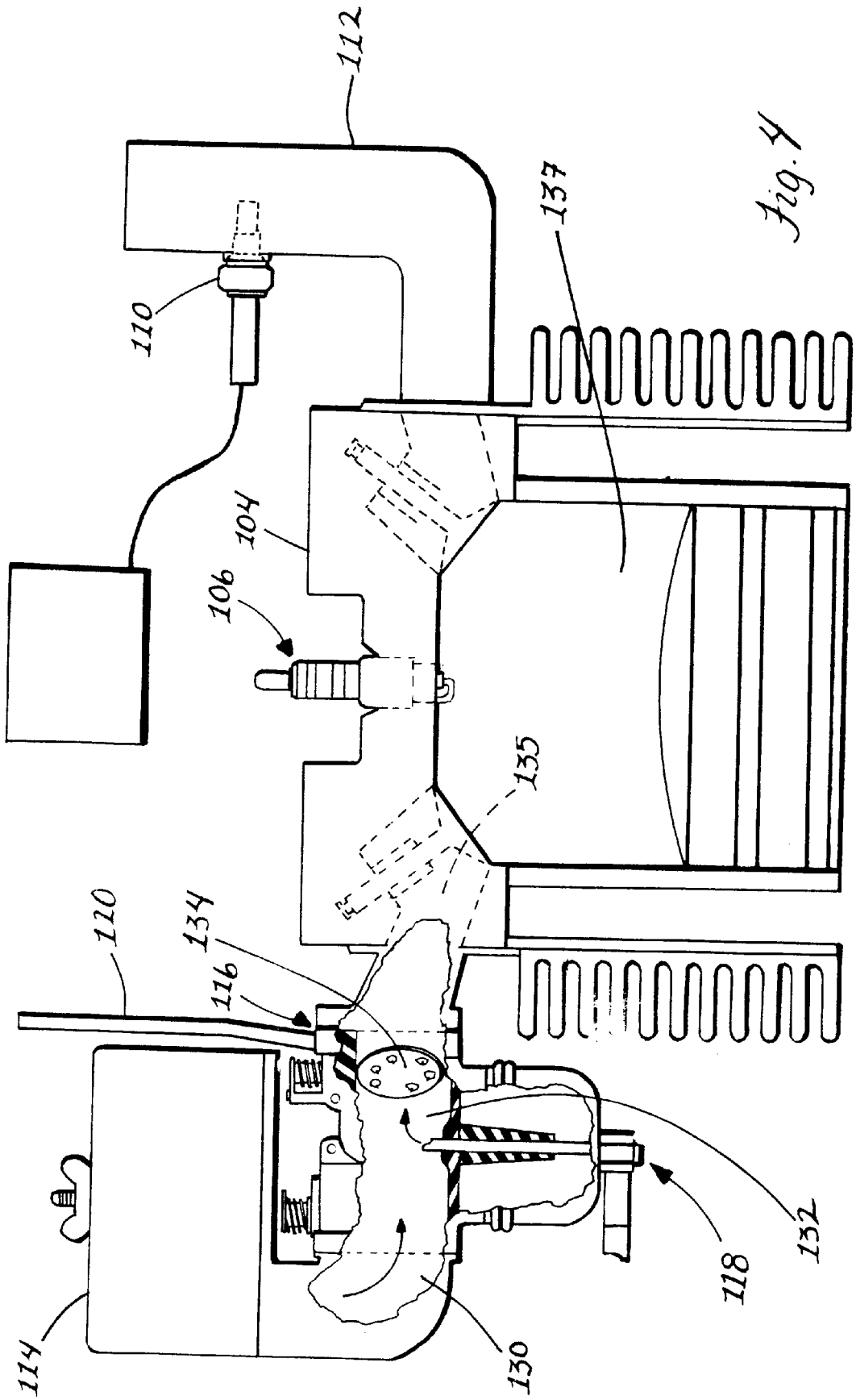
FIG. 4 is a more detailed block diagram illustrating a carburetor and cylinder for use in a fuel injection system according to the embodiment of FIG. 3.

A more detailed diagram of the fuel injection system of FIG. 3 is illustrated in FIG. 4. The vacuum hose 120 is provided from the carburetor 116 to the fuel injection controller 102. The vacuum hose 120 delivers the intake pressure to the MAP sensor in the fuel injection controller 102 as will be described in greater detail below. As shown, air is provided from the air cleaner 114 via a duct 130 into a air/fuel chamber 132. The fuel/air chamber 132 receives fuel from the fuel inlet pipe 118. A valve 134 regulates the introduction of the air/fuel mixture into the intake 135 and the cylinder 137.

Figure 5:
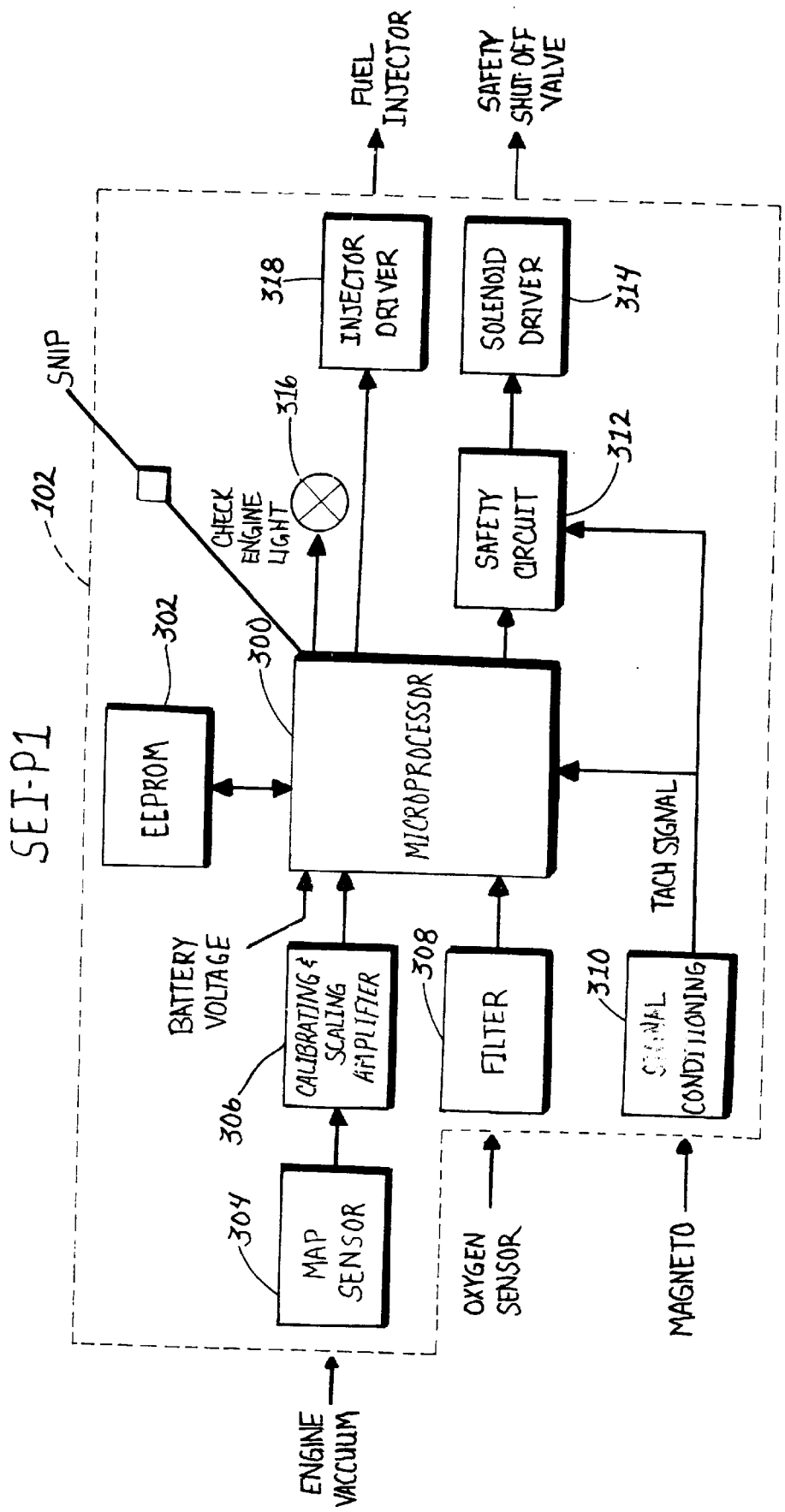
FIG. 5 is a block diagram of a fuel injection controller according to the embodiment of FIG. 3.

Turning now to FIG. 5, a block diagram of the fuel injection controller 102 is shown. At the heart of the fuel injection controller 102 is a control processor 300. The control processor 300 may be any of a variety of commonly available 8, 16, or 32-bit microprocessors or microcontrollers such as the Motorola HC05 or the Microchip 16 $C_{xx}$ processors. The control processor 300 includes an internal EPROM (not shown) used to store the fuel look-up table. The control processor 300 is coupled to an electrically erasable programmable read-only memory (EEPROM) 302, which is used to store look-up and correction tables for determining the width of fuel injection pulses. The control processor 300 is further configured to receive the SNIP loop input for de-activating the shut-off process discussed above. When the SHIP loop feature has been deactivated, the shut-off conditions merely cause the engine check light to light up.

The fuel injection controller 102 is configured to receive an engine vacuum reading from the vacuum hose 120 (FIG. 3). The engine vacuum reading is provided to the MAP sensor 304 which converts the pressure reading to an output voltage. The MAP sensor 304, in turn, provides the resulting MAP voltage signal to a scaling and calibrating amplifier 306, which provides a signal to the control processor 300. As discussed above, the control processor 300 uses the MAP voltage signal to distinguish the compression spark from the waste spark and causes the fuel to pulse a predetermined time after detection (e.g., 3 milliseconds). The control processor 300 thus synchronizes the fuel pulse to the compression spark. As will be discussed in greater detail below, the MAP voltage is further used as an input to a fuel look-up table stored in EEPROM 302 (and transferred to RAM on start-up) used to achieve the appropriate stoichiometric air-to-fuel ratio.

The control processor 300 is further coupled to receive a battery voltage signal. The battery voltage is used to open the fuel injector 122. Different voltages will vary the time required to open the injector and thus affect pulse width (i.e., pulse width varies inversely with battery voltage). The control processor 300 compensates for different (10–14 V) battery voltages by increasing or decreasing pulse width based on the detected voltage.

The control processor 300 is further coupled to an engine check light output 316 which is configured to be ON when the RPM signal is off. Further, an injector driver 318 is provided for driving the fuel injector 122, and a safety circuit 312 and solenoid driver 314 are provided for activating the safety shut-off valve 126. The safety circuit 312 is configured to cause the safety shut-off valve 126 to close when there is no RPM signal and when the control processor 300 has not enabled fuel flow.

The control processor 300 is further configured to receive a magneto input (i.e., the RPM or tachometer reading) via a signal conditioning circuit 310 which provides the tachometer signal to the control processor 300 and the safety circuit 312. The signal conditioning circuit 310 is provided to filter noise and ringing, so as to ensure a single 5 V pulse per spark. The fuel injection controller is configured to deliver one fuel pulse every two revolutions of the engine, three milliseconds after the control processor 300 and in one embodiment uses a peak-and-hold scheme to drive the fuel injector 122. While a saturated coil-type driver could be used, the peak-and-hold scheme is superior with respect to faster opening and closing times and heat build-up in the injector coil. More particularly, at the initiation of the fuel pulse, full battery voltage is applied to the fuel injector 122, until current reaches 2.4 amperes. After this peak current has been reached, the current is dropped back to 0.75 amperes to hold the injector open. Finally, a "kick-back" clamp at 25 V and 0.1 ms voltage use time protects the injector driver 318 and minimizes radio frequency interference.

The control processor 300 receives the oxygen sensor signal via a filter 308, which is provided for signal conditioning. The oxygen sensor signal produces a high voltage (~0.6–0.9 V) when the air/fuel ratio is rich and a low voltage (~0.2 V) when the air/fuel ratio is lean. The control processor 300 tries to maintain a stoichiometric air/fuel ratio by varying the fuel pulse width. The fuel pulse width is derived from a fuel table stored in control processor's internal memory EPROM, which is transferred to RAM during use.

The EEPROM 302 stores the correction table which has 36 cells (i.e., nine MAP values by four RPM values which are loaded at start-up). Each fuel look-up table value corresponds to a fuel injector pulse width. Thus, if the reading of the MAP value and the RPM value fall within a particular range, the fuel injector will be driven at a particular pulse width as defined by the value in the fuel look-up table.

The signal from the oxygen sensor 110 is used to provide a correction to the table value. More particularly, the oxygen sensor voltage is sampled after every spark firing (i.e., waste and compression) The oxygen sensor voltage corresponds to a low air/fuel ratio (i.e., less than 0.2 volts) if the engine is running lean and a high voltage (i.e., 0.6 to 0.9 volts) if the engine is running rich. The control processor 300 is provided with an internal register referred to as the "integrator register." The integrator register stores a value centered at 128. The integrator register value is incremented if the engine is running lean and decremented if the engine is running rich. The value from the integrator register is multiplied with the values in the fuel look-up table such that the fuel level is adjusted depending on whether the engine is running lean or rich (i.e., pulse width is decreased if the engine is running rich and increased if the engine is running lean).

The EEPROM 302 further stores a correction table used to provide "local" correction. The correction table is employed when the fuel table output at a particular RPM and MAP is off-center by more than three integrator counts (i.e., if the integrator register value is less than 126 or greater than 131). In that case, the entry in the fuel look-up table at that particular cell is adjusted so as to try to maintain the integrator register value at center. The values of the correction table are stored in the EEPROM 302 for use after the battery voltage has been removed and applied again.

Finally, a fuel map gain correction factor is used to provide an overall correction to each value in the look-up table if the total from all correction table shifts is richer by 10 counts or more from center. In this case, the gain correction factor will increase. Thus, an overall offset for the fuel table may be corrected by use of the fuel map gain correction factor. Value maintenance for this function is stored in the EEPROM.

Figure 6:
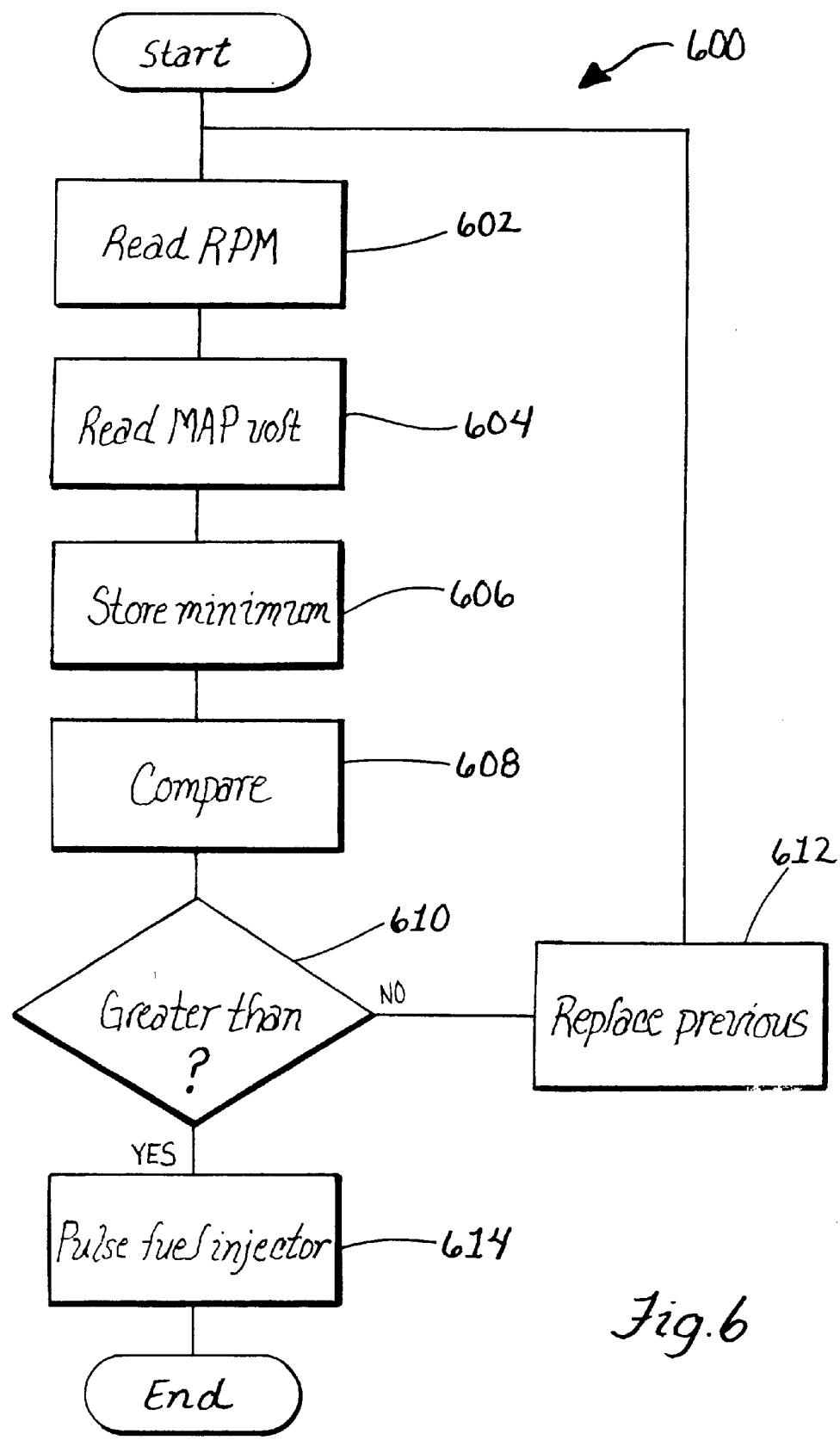
FIG. 6 is a flow chart illustrating a method for fuel injection according to the embodiment of FIG. 3.

Turning now to FIG. 6, a flow chart illustrating operation of an embodiment of the present invention is shown. More particularly, in a step 602, the control processor 300 receives the magneto signal via the signal conditioning unit 310. The magneto or RPM signal indicates when a spark has fired. Upon firing of the sparks, the control processor 300 samples the MAP sensor voltage in a step 604. As discussed above, the MAP sensor is provided to receive the engine vacuum signal into the MAP sensor 304 which then provides the signal to the calibrating and scaling amplifier 306 and then to the control processor 300.

The control processor 300 then stores the minimum value of the samples in a step 606. The newly sampled minimum is then compared with a previously stored minimum in a step 608. If the new minimum is greater than the previous minimum, then in a step 610, the control processor 300 determines that a compression firing has occurred and, in a step 614, pulses the fuel injector. If, however, in step 610 the control processor 300 had determined that the new minimum was not greater than the previous minimum, then the control processor 300 will replace the previous minimum with the new minimum, and will continue sampling.

As discussed above, the control processor 300 uses the MAP sensor voltage to synchronize the pulse firings with the compression spark. The MAP sensor voltage, the RPM level and an oxygen sensor input, as well as a battery voltage input, are also used to determine a width of the fuel injector pulse. More particularly, turning now to FIG. 7, a flowchart 700 illustrating the use of the above-mentioned inputs and a fuel look-up table in order to determine fuel injector pulse width is shown. In a step 702, the control processor 300 reads the battery voltage, which is used to open the fuel injector (i.e., pulse the solenoid). As noted above, too high a battery voltage can result in too short a pulse; too low a battery voltage can result in too long a pulse. Accordingly, the control processor 300 adjusts the fuel pulse width to compensate for differing battery voltages, in a step 704.

After start-up, the control processor 300 further reads the RPM level from the magneto and signal conditioning unit 310, and the MAP voltage level from the MAP sensor 304. More particularly, the control processor 300 identifies a start-up condition from key on until about 1000 RPM, during which the pulse is wider than at other times.

Then, the RPM level and the MAP voltage are used to determine the fuel injector pulse width. More particularly, after the first fuel injection pulse, the length or duration of each subsequent pulse is increased until a maximum is reached. Thereafter, the succeeding pulses are narrowed until the minimum is reached again and the process is repeated. This sweep cycling continues until an RPM of greater than 1000 is detected, indicating that the engine has started. This permits fast and reliable start up under varying conditions. Once the RPM level and MAP voltage level have been read, the control processor 300 accesses the fuel look-up table, in a step 708, for the appropriate pre-set fuel injector pulse width. The oxygen level in the engine is read in a step 710. The control processor 300 determines whether the engine is running rich or lean in a step 712. If the oxygen level indicates that the engine is running rich, the integrator register value is decremented, in a step 716. However, if the reading from the oxygen sensor indicates that the engine is running too lean, the integrator register value is incremented in a step 714. The resulting adjustments in the integrator register are applied to each cell in the look-up table, in a step 718. The processor then determines whether or not the value in the integrator register is off-center by more than 3 integrator counts, in a step 720. If the value in the integrator register is off-center, then the current cell is adjusted, with the update being stored in the correction table, in a step 722. The control processor 300 then sums the number of counts by which all the cells in the correction table are off-center in a step 724. If, in a step 726, the summation indicates that the total difference between the correction table shifts and the fuel look-up table is more than a predetermined number or threshold (for example, 10), then the control processor 300 shifts the entire table in a step 728. Finally, the appropriate cell value from the look-up table is applied to pulse the fuel injector, in a step 730.

The invention described in the above detailed description is not intended to be limited to the specific form set forth herein, but is intended to cover such alternatives, modifications and equivalents as can reasonably be included within the spirit and scope of the appended claims.

What is claimed is:

1. A fuel injection system, comprising:
   a fuel source;
   means connected to said fuel source for introducing fuel in predetermined pulses to an engine;
   a controller operably coupled to said introducing means, said controller including:
   first means for detecting spark firing in said engine;
   second means for detecting minima in engine manifold absolute pressure;
   means operably coupled to said first and second means for synchronizing said predetermined pulses responsive to detecting said spark firing and said minima, said synchronizing means including means for varying pulse widths of said predetermined pulses responsive to said manifold absolute pressure;
   an oxygen sensor for determining an air/fuel mixture in an exhaust of said engine, said oxygen sensor providing an input to said controller,
   wherein said varying means is configured to vary pulse widths of said predetermined pulses responsive to said oxygen sensor, and said varying means includes a fuel look-up table storing pulse width values according to engine RPM (revolutions per minute) and said manifold absolute pressure; and
   a register for storing a first common correction factor applied to said pulse width values responsive to said oxygen sensor.

2. A fuel injection system according to claim 1 wherein said first common correction factor is increased or decreased depending on a value from said oxygen sensor.

3. A fuel injection system according to claim 2, wherein said varying means includes a correction table for storing corrections for individual ones of said pulse width values if said first common correction factor varies by a predetermined value from a fixed value.

4. A fuel injection system according to claim 3, wherein said varying means includes means for applying a second common correction factor to said pulse width values in said look-up table if said corrections in said correction table exceed a predetermined value.

5. A method for operating a fuel injector in an engine, comprising:
   detecting engine manifold absolute pressure;
   detecting spark firings;

synchronizing fuel pulses from said fuel injector to detected minima in said manifold absolute pressure and said spark firings;

further comprising detecting engine RPM levels;

adjusting widths of said fuel pulses responsive to said engine manifold absolute pressure and said engine RPM levels,
  wherein said adjusting comprises accessing a table of fuel pulse width values according to said engine manifold absolute pressure and said engine RPM levels; and
  applying a correction factor to said pulse width value depending on a value from an engine oxygen sensor, and
    said adjusting including storing corrections for individual ones of said pulse width values in a correction table if said correction factor varies by a predetermined value from a fixed value.

6. A method according to claim 5, wherein said adjusting includes applying a common correction factor to said pulse width values in said look-up table if said corrections in said correction table exceed a predetermined value.

7. A system for maintaining optimal fuel supply to an engine compensating for changes in operating conditions thereof, the system comprising:
  a pressure sensor for producing a pressure signal based on engine intake pressure;
  a controller;
  a first fuel look-up table containing initial pulse widths of fuel delivery based on optimum combustion of the fuel by the engine, the initial pulse widths being stored in the controller according to engine speed and the pressure detected by the sensor thereat;
  an engine inefficiency sensor for detecting predetermined fuel combustion conditions;
  a second fuel look-up table of adjusted pulse widths of fuel delivery stored in the controller and being commonly corrected from the initial pulse widths to compensate for change in operating conditions of the engine based on combustion inefficiencies of the combustion conditions detected by the sensor across a representative sampling the initial stored pulse widths; and
  an electro-mechanical fuel delivery device for outputting fuel according to the control signal.

8. The system of claim 7, wherein the pressure sensor is a manifold absolute pressure (MAP) sensor.

9. The system of claim 7, wherein the controller includes a correction table for adjusting values stored in the fuel look-up table.

10. The system of claim 7, wherein the controller includes an integrator for adjusting the control signal based on a signal from the engine inefficiency sensor.

11. The system of claim 7, wherein the electro-mechanical fuel delivery device includes a fuel injector.

12. A fuel delivery system for optimizing performance of an internal combustion engine by correcting for changes in operating conditions thereof via control over fuel delivery thereto for combustion thereof, the fuel delivery system comprising:
  a controller;
  an initial set of pulse widths of fuel delivery stored in the controller for predetermined intervals of engine operation to provide the engine with optimal air/fuel ratios at each interval of operation;
  a sensor connected to the controller for tracking a predetermined operating condition of the engine indicative of operating efficiency thereof to allow the controller to determine whether there is a predetermined variation from the optimal air/fuel ratio for a particular engine operating interval; and
  an adjusted set of fuel delivery pulse widths from the initial set for each predetermined interval of engine operation that is stored in the controller upon reaching a threshold level of the predetermined variations so that the adjusted fuel delivery pulse widths are used to take into account changing engine operating efficiencies for maintaining optimal air/fuel ratios for the engine.

13. The fuel delivery system of claim 12 wherein the engine includes at least one cylinder to which the fuel is delivered, and the tracked predetermined operating condition is downstream of the cylinder to determine combustion efficiency of the fuel pulse width delivered to the cylinder.

14. The fuel delivery system of claim 12 wherein the engine includes at least one cylinder to which fuel is delivered thereto, and
  a second sensor connected to the controller for detecting a second predetermined operating condition upstream of the cylinder.

15. The fuel delivery system of claim 14 wherein the second predetermined operating condition is an intake manifold pressure upstream of the cylinder.

16. The fuel delivery system of claim 14 wherein the second predetermined operating condition is variable at each predetermined interval of engine operation, and the fuel delivery pulse widths are predetermined based on the predetermined interval and the detected second predetermined operating condition.

17. The fuel delivery system of claim 12 wherein the engine includes at least one cylinder to which fuel is delivered, the tracked predetermined operating condition is indicative of how rich or lean the air/fuel ratio is based on combustion in the cylinder, and
  the predetermined variation being indicative of the extent of richness or leanness of the air/fuel ratio.

18. The fuel delivery system of claim 17 wherein the sensor is an oxygen sensor downstream of the cylinder in exhaust therefrom, and the predetermined variation is an oxygen content of the exhaust that is approximately 25% varied from a stoichiometric oxygen content in the exhaust indicative of stoichiometric combustion.

19. The fuel delivery system of claim 12 wherein the engine includes a predetermined operating range of engine operation intervals, and the pulse widths correspond to engine operating intervals across the entire predetermined operating range of the engine.

20. A method for controlling the delivery of fuel to a cylinder of an internal combustion engine, the method comprising:
  delivering initial pulse widths of fuel to the cylinder stored in a controller and which are optimized based on particular predetermined intervals of operation of the engine;
  tracking a predetermined engine operating condition indicative of operating efficiency thereof;
  determining whether a predetermined variation from an optimal air/fuel ratio for a particular engine operating interval has been reached;
  counting the number of predetermined variations that are reached for different engine operating intervals; and
  adjusting the pulse widths of fuel delivery when the counted predetermined variations have reached a threshold level thereof for maintaining the optimal air/fuel ratio for both those engine operating intervals at which the predetermined variation has been reached and intervals where it has not been reached.

21. The method of claim 20 wherein the predetermined operating condition is tracked by sensing oxygen content of engine exhaust to determine the richness or leanness of the air/fuel ratio.

22. The method of claim 20 including sensing the predetermined engine operating condition and adjusting pulse widths of fuel for a particular engine operating interval when a variation from the optimal air/fuel ratio is sensed that is less than the predetermined variation.

23. The method of claim 20 wherein the predetermined engine operating condition is tracked by sensing oxygen content in exhaust from the cylinder, and the predetermined variation is determined by signalling the controller with exhaust oxygen content information and determining whether the oxygen content is varied by a predetermined amount from stoichiometric oxygen content in the exhaust indicative of the occurrence of stoichiometric combustion in the cylinder.

24. The method of claim 23 wherein the predetermined amount is approximately 25% difference from the stoichiometric oxygen content.

25. The method of claim 20 including storing the adjusted pulse widths in the controller, and adjusting the stored adjusted pulse widths in the same manner as the initial pulse widths during subsequent engine operations.

26. In an internal combustion engine having at least one cylinder and fuel delivered thereto for combustion thereof, a fuel delivery system comprising:

an electronic controller including read-write memory having a first memory location that stores initial fuel control values for controlling the delivery of fuel to the cylinder;

a first sensor for detecting a first predetermined engine operating condition corresponding to fuel demand conditions of the engine;

a second sensor for detecting an output engine operating condition and providing the controller with signals corresponding to the combustion efficiency of fuel in the cylinder;

a first integer register for storing a correction factor based on the signals received from the second sensor which vary in response to detected inefficient combustion in the cylinder;

a second integer register for temporarily storing adjusted fuel control values that are based on the correction factors stored in the first integer register;

a second memory location for storing the adjusted fuel control values when the correction factor in the first integer register associated with particular ones of the fuel control values varies from a predetermined correction factor number by a predetermined amount;

a counter for counting the number of adjusted fuel control values that have been stored in the second memory location; and a third memory location for storing shifted fuel control values that are based on a common correction factor applied to each initial fuel control value when the counter is greater than a predetermined counter number.

27. The fuel delivery system of claim 26 including an electronically controlled fuel injector or throttle for delivering fuel to the cylinder.

28. The fuel delivery system of claim 26 wherein the first, second and third memory locations are locations in the electronic read-write EEPROM for storing initial and shifted fuel control values of fuel delivery in the respective memory location therefor.

29. The fuel delivery system of claim 26 wherein the first sensor includes an engine RPM (Revolutions per minute) sensor connected to the controller so that the fuel control values vary at each RPM level of the engine.

30. The fuel delivery system of claim 29 wherein the first sensor further includes a manifold pressure sensor connected to the controller which detects a variable intake manifold pressure for each detected RPM with the fuel control values being based on the detected RPM and the detected intake manifold pressure thereat.

31. The fuel delivery system of claim 26 wherein the second sensor is an oxygen sensor connected to the controller for detecting oxygen content in exhaust from the cylinder to allow the controller to cause shifting of the initial fuel control values to the shifted fuel control values stored in the third memory location when the detected oxygen content has varied from a stoichiometric oxygen content by a predetermined level corresponding to the predetermined amount in variation between the correction factor and the predetermined correction factor number.

* * * * *